United States Patent
Kurihara et al.

[19]

[11] Patent Number: 6,055,029
[45] Date of Patent: Apr. 25, 2000

[54] BACKLIGHTING SYSTEM FOR A LIQUID CRYSTAL DISPLAY INCLUDING AN INTEGRALLY MOLDED LIGHT GUIDING PLATE AND FRAME WITH A DEFORMATION ABSORBING MEANS

[75] Inventors: Mikio Kurihara; Fumihisa Hanzawa; Yoji Oki; Kazushige Ohta; Takashi Noma; Hidiaki Sasaya; Tatsuo Fukui, all of Kanagawa-ken, Japan

[73] Assignees: Stanley Electric Co., Ltd., Tokyo, Japan; International Business Machines Corporation, Armonk, N.Y.

[21] Appl. No.: 08/898,271

[22] Filed: Jul. 22, 1997

[30] Foreign Application Priority Data

Jul. 23, 1996 [JP] Japan .................................... 8-193290

[51] Int. Cl.[7] .................................................. G02F 1/1335
[52] U.S. Cl. .................................. 349/65; 349/58; 362/31
[58] Field of Search ................................ 349/65, 58, 187; 362/26, 31

[56] References Cited

U.S. PATENT DOCUMENTS

| | | | |
|---|---|---|---|
| 4,806,586 | 2/1989 | Nakai | 524/413 |
| 4,945,349 | 7/1990 | Sanai | 349/58 |
| 5,219,936 | 6/1993 | Honkomp et al. | 525/67 |
| 5,313,318 | 5/1994 | Gruenberg et al. | 349/58 |
| 5,317,430 | 5/1994 | Uratani | 349/65 |
| 5,470,909 | 11/1995 | Nishii et al. | 524/538 |
| 5,539,552 | 7/1996 | Desai et al. | 349/58 |
| 5,723,526 | 3/1998 | Nagasawa | 524/451 |

*Primary Examiner*—Kenneth Parker
*Attorney, Agent, or Firm*—Weingarten, Schurgin, Gagnebin & Hayes LLP

[57] ABSTRACT

Since a backlighting apparatus 1 for liquid crystal display is constituted such that a light guiding plate 2 and a frame 3 are molded together as a single unit provided with a deformation relaxation design, an attaching unit and parts, such as attaching feet and screws, for attaching the light guiding plate 2 to the frame 3 are not required, thereby making it possible to reduce the thickness and size of the backlighting apparatus 1 for liquid crystal display which has been restricted by the sizes of these parts.

7 Claims, 4 Drawing Sheets

PRIOR ART

BACKLIGHTING SYSTEM FOR A LIQUID CRYSTAL DISPLAY INCLUDING AN INTEGRALLY MOLDED LIGHT GUIDING PLATE AND FRAME WITH A DEFORMATION ABSORBING MEANS

BACKGROUND OF THE INVENTION

1. Field of the Invention

This invention relates to a backlighting system for illuminating a liquid crystal display as used in a display unit of a portable computer, portable or car TV receiver or the like.

2. Background Art

FIGS. 5 and 6 show an example of a backlighting apparatus 90 of the prior art. A light guiding plate 91 is formed such that a main body 91a is substantially rectangular, in shape, and is from an achromatic transparent resin such as an acrylic resin and fitted with tongue-shaped attaching feet 91b at a plurality of, positions of the periphery of the main body 91a.

A frame 92 is substantially U-shaped to surround the light guiding plate 91 from three directions and formed of a suitable white opaque resin member. Receiving portions 92a are shaped like a recess to be fitted onto the attaching feet 91b, and are formed in the frame 92 at positions corresponding to the attaching feet 91b.

The light guiding plate 91 and the frame 92 are connected by screws 93 to form into a single unit. In this integrated state, as shown in FIG. 6, a space D is formed between an end surface 91c of the light guiding plate 91 and an inner end surface 92b of the frame 92 so that they face each other with an air layer interposed therebetween.

FIG. 7 shows a state where the light guiding plate 91 and the frame 92 are closely connected with each other. In this state, when light L1 passes through the light guiding plate 91 and reaches the end surface 91c, irregular reflection occurs on the inner end surface 92b of the frame 92 that is in close contact with the end surface 91c. The radiation of the irregularly reflected light L2 causes such nonuniform illumination that a portion near the end surface 91c of the light guiding plate 91 is brighter than other portions, thus deteriorating the performance of the backlighting apparatus 90.

A target backlighting apparatus 90 is obtained by attaching a diffusion sheet 94 formed of a polyester film to the assembly of the light guiding plate 91 and the frame 92, the frame 92, or the light guiding plate 91 with a double-coated adhesive tape 95 at the entire periphery or two opposite sides thereof to cover the illuminated surface 91d of the light guiding plate 91.

However, the backlighting apparatus 90 of the prior art as described above has the following problems. Firstly, since the light guiding plate 91 and the frame 92 are connected with each other by the screws 93 to be integrated into a single unit, the light guiding plate 91 must have at least a thickness as large as the total length of the screw 93. Accordingly, the backlighting apparatus 90 becomes bulky, thereby increasing the size of an apparatus employing it such as a portable computer.

Secondly, since the light guiding plate 91 is partially attached to the frame 92 via the attaching feet 91b, attaching strength is insufficient, which may cause the attaching feet 91b to be broken by stress generated by a fall or vibration during the transportation of the apparatus. As a result, the light guiding plate 91 may be separated from the frame 92.

Further, since the diffusion sheet 94 is attached to the frame 92 at the entire periphery thereof, the difference of thermal expansion coefficients therebetween may cause diffusion sheet 94 having low strength to become curved as shown in FIG. 6, thereby causing nonuniform illumination. Solutions to these problems have been awaited.

SUMMARY OF THE INVENTION

To solve the above problems of the prior art, the present invention provides a backlighting apparatus for a liquid crystal display. The disclosed system includes a light guiding plate shaped substantially as a rectangle, and formed of a transparent member. The system further includes a substantially U-shaped frame to surround the light guiding plate from three directions, and a diffusion sheet covering the illuminated surface of the light guiding plate. The light guiding plate and the frame are molded together as a single unit and provided with a deformation relaxation design, wherein the diffusion sheet is attached to the light guiding plate or the frame on one side thereof.

BRIEF DESCRIPTION OF THE DRAWINGS

These and other objects and advantages of the present invention will become apparent from the following description with reference to the accompanying drawings, wherein.

DETAILED DESCRIPTION OF THE PREFERRED EMBODIMENTS

Figure 1:
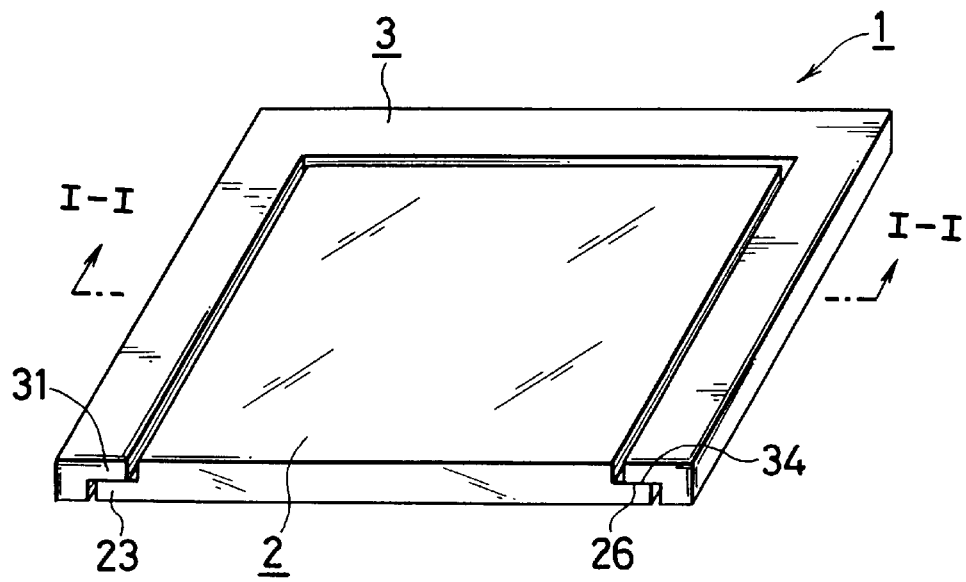
FIG. 1 is a perspective view of a backlighting apparatus for a liquid crystal display according to an embodiment of the present invention.

The present invention is described in detail with reference to preferred embodiments illustrated in the accompanying figures. Reference numeral 1 in FIGS. 1 and 2 indicates a backlighting apparatus for a liquid crystal display of the present invention. This backlighting apparatus 1 is composed of a light guiding plate 2, a frame 3 and a diffusion sheet 4. To simplify the figures, the diffusion sheet 4 and portions for attaching the sheet 4 are not shown in FIG. 1.

The present invention is the same as the prior art in that the light guiding plate 2 has rectangular illuminated surface 21 that is made from an achromatic transparent resin such as an acrylic resin. The frame 3 is substantially U-shaped and made from a white opaque resin, and the diffusion sheet 4 is connected to the frame 3 to cover the illuminated surface 21.

In the present invention, the light guiding plate 2 and the frame 3 are molded together as a single unit by for example two-color molding. Attaching feet and screws, are accordingly not required, thereby making possible a size reduction. The strength of the system is also improved by such two-color molding of the light guiding plate 2 and the frame 3.

Figure 7:
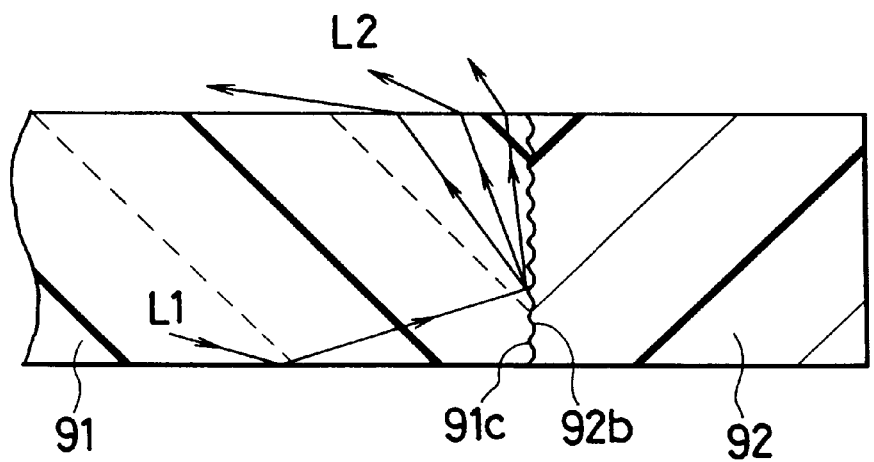
FIG. 7 illustrates a light guiding plate and a frame that are closely adhered to each other.

If the light guiding plate 2 and the frame 3 are merely joined together, irregular reflection occurs on an interface between the light guiding plate 2 and the frame 3, resulting in nonuniform brightness on the illuminated surface 21 of the light guiding plate 2 (please refer to FIG. 7 of the prior art). Therefore, in the present invention, a flange portion 23 having a thickness substantially as large as half of the thickness t of the light guiding plate 2 projects from a side surface portion on the rear surface 22 side of the light guiding plate 2.

The frame 3 is provided with a flange receiving portion 31 for the flange portion 23 of the light guiding plate 2 and a space D is provided between an end surface 24 of the light guiding plate 24 and an inner end surface 33 of the frame 3 and between an end surface 25 of the flange portion of the light guiding plate 2 and an end surface 32 of the receiving portion of the frame 3. In this way the light guiding plate 2 and the frame 3 are joined together at their flange surfaces 26 and 34 to be integrated into a single unit.

The interface between the light guiding plate 2 and the frame 3 is substantially in parallel to the direction of light passing through the light guiding plate 2. The amount of light incident to the interface is small. At the same time, even if light incident to the interface is irregularly reflected, the reflected light goes towards the rear surface 22 of the light guiding plate 2. Therefore, almost no influence on the illuminated surface 21 is observed.

As described above, the strength of the backlighting apparatus 1 for liquid crystal display is improved by integrating the light guiding plate 2 and the frame 3 into a single unit on almost all the areas of their flange surfaces 26 and 34. However, if there is a difference of dimensional change characteristics such as the difference of thermal expansion coefficient or the difference of shrinkage factor at the time of molding between a member constituting the light guiding plate 2 and a member constituting a frame 3, there is the possibility that deformation such as war page may occur in the integrated unit of the light guiding plate 2 and the frame 3 due to variations in ambient temperature or shrinkage immediately after molding.

The present invention also provides means for handling such deformation. A first deformation relaxation design is to select members constituting the light guiding plate 2 and the plate 3 whose differences of linear expansion coefficient and water absorption coefficient are each within a range of ±50%, whereby the occurrence of deformation caused by the difference of dimensional change is prevented.

Since the light guiding plate 1 and the frame 3 of the backlighting apparatus 1 for liquid crystal display are both formed of a resin member, limitation only to linear expansion coefficient as in a metal member is not satisfactory to prevent the occurrence of deformation. Therefore, both the linear expansion coefficient and water absorption coefficient which are the factors of changing the size of a resin member are limited in the present invention to eliminate deformation under any environment.

In an example embodiment of the members used as the light guiding plate 2 and the frame 3, an acrylic resin is most suitable for the light guiding plate 2 from a view point of optical characteristics such as transparency. Therefore, when an acrylic resin colored white is used for the frame 3, the dimensional changes of the light guiding plate 2 and the frame 3 caused by ambient temperature and humidity variations are perfectly the same, thus eliminating deformation.

However, acrylic resin is inferior in mechanical strength such as impact resistance. For example, when it is used in an embodiment which receives strong external vibration, such as in a car based-before apparatus, it may be insufficient in strength. Accordingly, an alloy material of an acrylic resin and a polycarbonate resin or an alloy material of a polycarbonate resin and a vinyl resin may be used for the frame 3 to make the amount of dimensional change thereof based on thermal expansion coefficient almost equal to that of the light guiding plate 2, thereby making it possible to increase the strength.

Further, a second deformation relaxation design used in the present invention is to use a flexible resin member for the frame 3. To further improve strength and reduce costs, an ABS resin or PP resin, for example, is preferably used for the frame 3.

In this case, since there is a difference in thermal expansion coefficients of the resin constituting the frame 3 and the acrylic resin constituting the light guiding plate 2, the resin member constituting the frame 3, such as a PP resin, is mixed with 20 to 40% of glass fibers to reduce its thermal expansion coefficient of $11 \times 10^{-5}$° C., which would otherwise be much greater than that coefficient of the acrylic resin ($7 \times 10^{-5}$° C.), so as to eliminate deformation.

Figure 6:
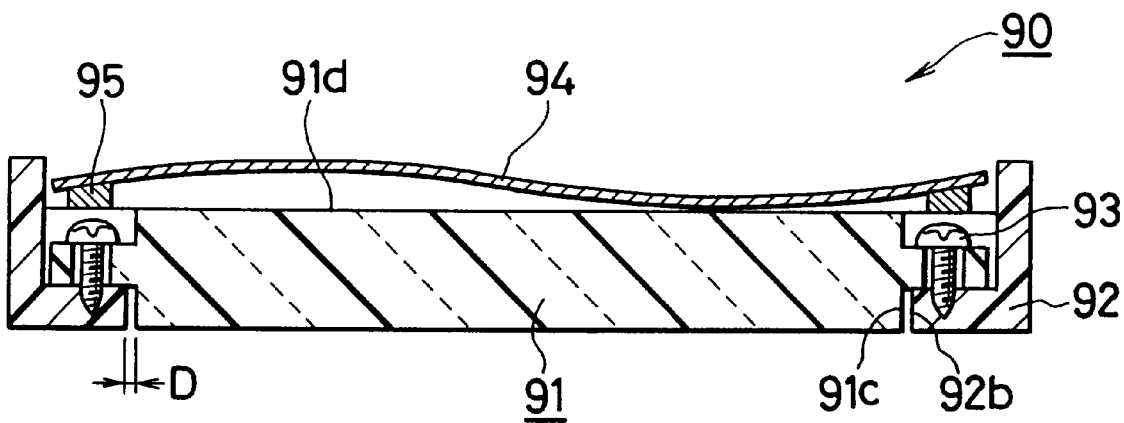
FIG. 6 is a sectional view taken on line B—B of FIG. 5.

While the prevention of deformation which occurs between the light guiding plate 2 and the frame 3 has been described above, similar deformation occurs between the frame 3 and the diffusion sheet 4 when the diffusion sheet 4 is attached to the frame 3 (see FIG. 6 of the prior art). To cope with this, in the present invention, only one side of the above diffusion sheet 4 is attached to the frame 3 with a double-coated adhesive tape 5 and the other three sides thereof are made free ends to prevent the occurrence of deformation.

Figure 2:
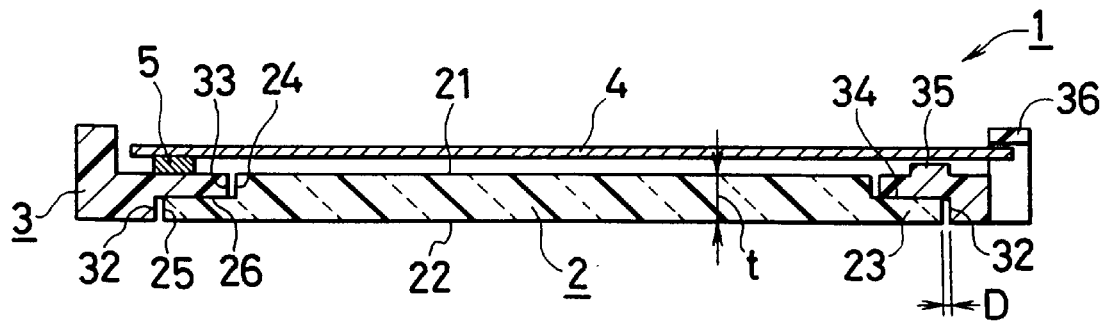
FIG. 2 is a sectional view taken on line A—A of FIG. 1.

As shown in FIG. 2, it is preferred that a pillow portion 35 and a bridging portion 36, for example, are formed in a portion of the frame 3 where a free end side of the diffusion sheet 4 is positioned so that the free end side of the diffusion sheet 4 is sandwiched between the pillow portion 35 and the bridging portion 36 such that it is slidable and the diffusion sheet 4 is held at a predetermined position.

Figure 3:
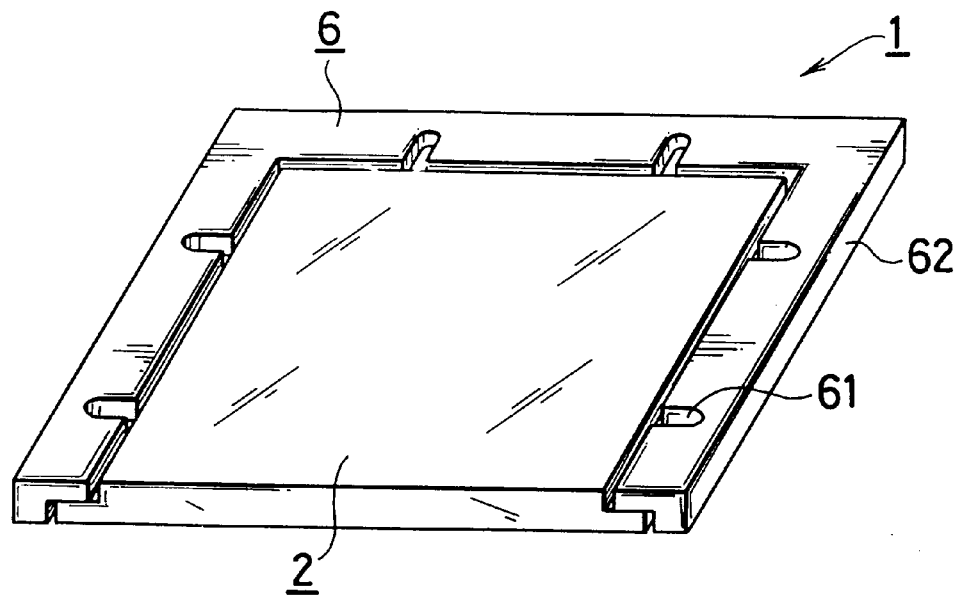
FIG. 3 is a perspective view of a backlighting apparatus for a liquid crystal display according to another embodiment of the present invention.

FIG. 3 shows another embodiment of the present invention. This embodiment relates to the relaxation of a dimensional difference between the light guiding plate 2 and the frame 3 caused by temperature or humidity variations, that is, and includes a third deformation relaxation design. Although the physical properties of the members constituting the light guiding plate 2 and the frame 3 are equalized or approximated to prevent deformation in all of the above embodiments, deformation is prevented mechanically or structurally in this embodiment.

That is, in this embodiment, at least one slit substantially perpendicular to sides of the frame 6 to be joined with the light guiding plate 2 is formed in each of three sides of the frame 6. This slit 61, as shown in the figure, may be provided from a junction line P toward an outer periphery 62 or from the outer periphery 62 toward the junction line P.

Therefore, even if there is a dimensional difference between the light guiding plate 2 and the frame 6 due to temperature variations, the slit 61 is narrowed or expanded to absorb such a dimensional difference, thereby preventing deformation. It is accordingly possible to select the most suitable member for each of the light guiding plate 2 and the frame 6.

Figure 4:
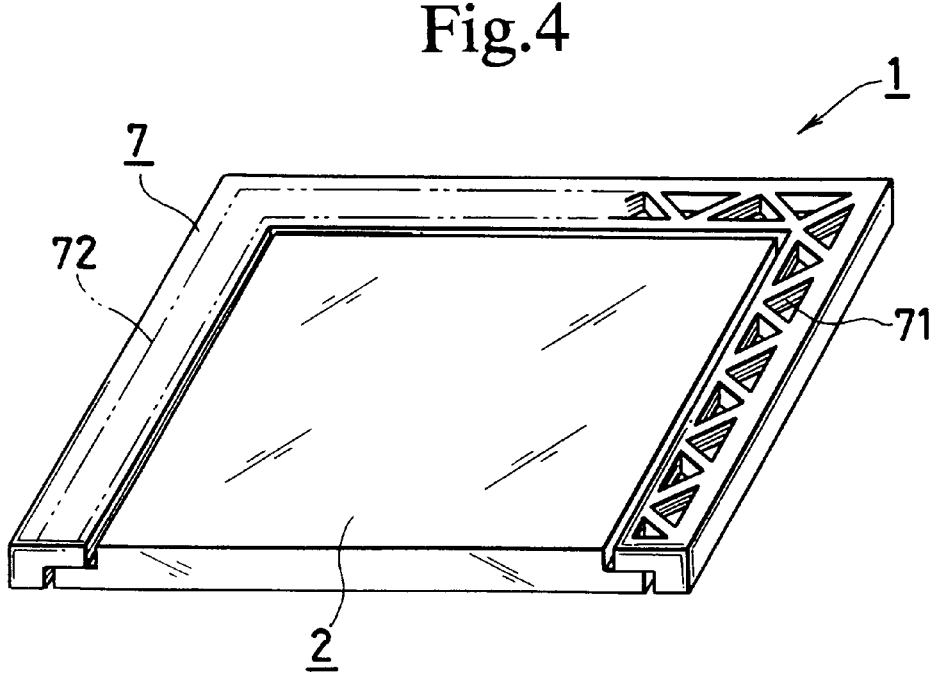
FIG. 4 is a perspective view of a backlighting apparatus for a liquid crystal display according to further another embodiment of the present invention.
Figure 5:
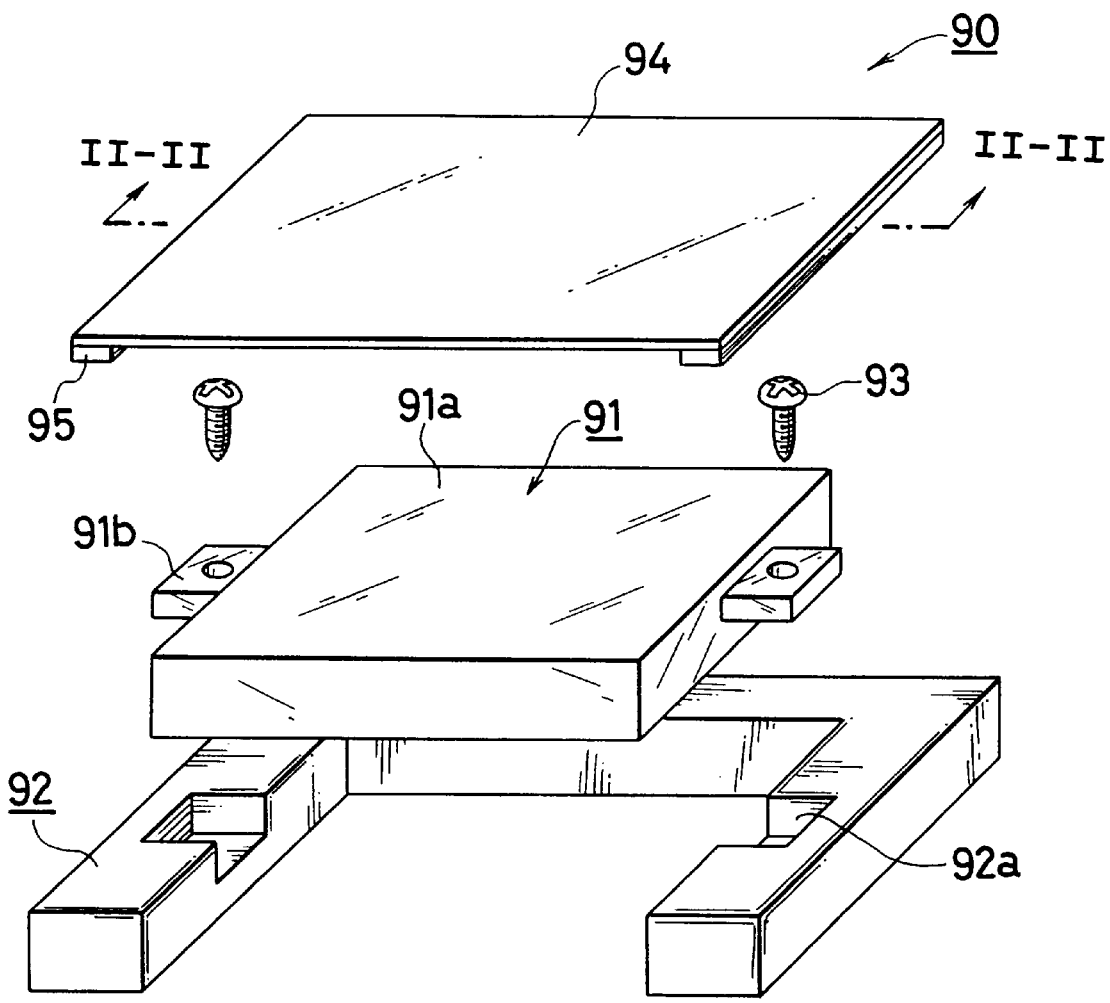
FIG. 5 is a partially exploded perspective view of the prior art.

FIG. 4 shows still another embodiment of the present invention. This embodiment also relates to the relaxation of a dimensional difference between the light guiding plate 2 and the frame 7, and includes a fourth deformation relaxation design. In this embodiment, in place of the slits 61 of the previous embodiment, a plurality of lightening windows 71 which are through holes extending in the thickness direction of the frame 7 are formed in the frame 7 to form a honeycomb portion 72. Therefore, when a dimensional difference between the light guiding plate 2 and the frame 7 occurs, the honeycomb portion 72, namely, lighting windows 71 are each slightly deformed to absorb the dimensional difference.

As described on the foregoing pages, the present invention provides, a backlighting apparatus for liquid crystal display is disclosed including a light guiding plate and a frame that are molded together as a single unit by a deformation relaxation design. A mechanism, for attaching the light guiding plate to the frame such as screws, and other attaching parts, is not required. The backlighting apparatus for liquid crystal display, which in previous systems has been restricted by the sizes of the attaching feet and screws, can be made thinner than that of the prior art, thereby making it possible to further reduce the size and weight of an apparatus which employs this type of backlighting apparatus for liquid crystal display.

The present invention further provides that the light guiding plate and the frame are almost wholly joined together by one-piece molding to increase the system's strength, thereby improving reliability, The light guiding plate and the frame may be partially joined together with the attaching feet and screws and easily broken by the concentration of stress on an interface therebetween caused by the fall of an apparatus or impact in the prior art.

To mold the above light guiding plate and frame together as a single unit, the present invention also provides means for preventing deformation caused by a dimensional change due to variations in ambient temperature because of the difference of thermal expansion coefficient between the light guiding plate and the frame. Therefore, the present invention ensures that the light guiding plate and the frame remain molded together as a single unit.

What is claimed is:

1. A backlighting apparatus for a liquid crystal display comprising:
   a substantially transparent light guiding plate having a substantially rectangular shape;
   a frame formed to surround at least two sides of the light guiding plate; and
   a diffusion sheet covering an illuminated surface of the light guiding plate, wherein
   the light guiding plate and the frame are molded together by one piece molding to form a single unit resistant to deformation in said single unit resulting from expansion due to environmental effects,
   wherein the light guiding plate has a flange portion having a thickness smaller than that of a central portion thereof and projecting from at least one side thereof, the frame has a flange receiving portion corresponding to the flange portion, and the flange portion is joined together at the flange receiving portion.

2. A backlighting apparatus for a liquid crystal display, comprising:
   a substantially transparent light guiding plate having a substantially rectangular shape;
   a frame formed to surround at least two sides of the light guiding plate; and
   a diffusion sheet covering an illuminated surface of the light guiding plate, wherein
   the light guiding plate and the frame are molded together to form a single unit resistant to deformation resulting from water absorption expansion in said single unit, and wherein materials for at least the light guiding plate and the frame are selected whose difference of water absorption coefficients of expansion is within a range of ±50%, relative to the water absorption coefficient of expansion of the material of the frame.

3. A backlighting apparatus for a liquid crystal display, comprising:
   a substantially transparent light guiding plate having a substantially rectangular shape;
   a frame formed to surround at least two sides of the light guiding plate; and
   a diffusion sheet covering an illuminated surface of the light guiding plate, wherein
   the light guiding plate and the frame are molded together to form a single unit resistant to deformation in said single unit resulting from expansion due to environmental effects, and including slits in at least one side of the frame, wherein the resistance to deformation is provided at least in part by the slits.

4. A backlighting apparatus for a liquid crystal display, comprising:
   a substantially transparent light guiding plate having a substantially rectangular shape;
   a frame formed to surround at least two sides of the light guiding plate; and
   a diffusion sheet covering an illuminated surface of the light guiding plate, wherein
   the light guiding plate and the frame are molded together to form a single unit resistant to deformation in said single unit resulting from expansion due to environmental effects, and including a plurality of through holes in the frame, extending in the thickness direction of the frame, wherein the resistance to deformation is provided at least in part by the through holes.

5. A backlighting apparatus for a liquid crystal display, comprising:
   a substantially transparent light guiding plate having a substantially rectangular shape;
   a frame formed to surround at least two sides of the light guiding plate; and
   a diffusion sheet covering an illuminated surface of the light guiding plate, wherein
   the light guiding plate and the frame are molded together to form a single unit resistant to deformation resulting from thermal or water absorption expansion in said single unit, and wherein
   materials for at least the light guiding plate and the frame are selected having a difference of thermal expansion coefficients within a range of ±50%, relative to the thermal expansion coefficient of the frame,
   materials for at least the light guiding plate and the frame are selected having a difference of water absorption coefficients of expansion within a range of ±50%, relative to the water absorption coefficient of expansion of the frame,
   the materials are an acrylic resin for the light guiding plate and wherein the frame comprises one of the set consisting of an acrylic resin, an alloy material of an acrylic resin and a polycarbonate resin, an alloy material of a polycarbonate resin and a vinyl resin, and a resin having a glass content of 20 to 40%, and wherein the diffusion sheet is attached to one of the set of the light guiding plate and the frame.

6. A backlighting apparatus for a liquid crystal display, comprising:

a substantially transparent light guiding plate having a substantially rectangular shape;

a frame formed to surround at least two sides of the light guiding plate; and a diffusion sheet covering an illuminated surface of the light guiding plate, wherein the light guiding plate and the frame are molded together to form a single unit resistant to deformation resulting from water absorption expansion in said single unit, and wherein materials for at least the light guiding plate and the frame are selected whose difference of water absorption coefficients of expansion is within a range of ±50%, relative to the water absorption coefficient of expansion of the material of the light guiding plate.

7. A backlighting apparatus for a liquid crystal display, comprising:

a substantially transparent light guiding plate having a substantially rectangular shape;

a frame formed to surround at least two sides of the light guiding plate; and a diffusion sheet covering an illuminated surface of the light guiding plate, wherein the light guiding plate and the frame are molded together by one piece molding to form a single unit resistant to deformation in said single unit resulting from expansion due to environmental effects, wherein the light guiding plate has a flange portion having a thickness smaller than that of a central portion thereof and projecting from at least one side thereof, the frame has a flange receiving portion corresponding to the flange portion, and wherein the flange portion is joined to the flange receiving portion such that a space is present between an end surface of the light guiding plate and an inner end surface of the frame.

* * * * *